(12) United States Patent
Ni

(10) Patent No.: US 7,225,504 B2
(45) Date of Patent: Jun. 5, 2007

(54) NOISE SUPPRESSOR FOR USE WITH VACUUM AIR CLEANER

(75) Inventor: Zugen Ni, Suzhou (CN)

(73) Assignee: Suzhou Kingclean Floorcare Co., Ltd., Jiangsu (CN)

( * ) Notice: Subject to any disclaimer, the term of this patent is extended or adjusted under 35 U.S.C. 154(b) by 434 days.

(21) Appl. No.: 10/410,745

(22) Filed: Apr. 10, 2003

(65) Prior Publication Data

US 2005/0097702 A1     May 12, 2005

(30) Foreign Application Priority Data

Dec. 12, 2002   (CN) .............................. 02 1 48547

(51) Int. Cl.
A47L 9/00         (2006.01)
(52) U.S. Cl. ........................ 15/326; 181/257
(58) Field of Classification Search ................. 15/326, 15/327.1, 327.2, 327.3, 327.4, 327.5, 327.6, 15/327.7, 350–353, 412, 413; 181/212, 214, 181/224, 229, 231, 247–249, 251, 252, 257, 181/258, 268, 269

See application file for complete search history.

(56) References Cited

U.S. PATENT DOCUMENTS 3,115,209 A * 12/1963 Bembinster ................. 181/243
3,688,868 A * 9/1972 Gibel et al. ................. 181/230
4,368,799 A * 1/1983 Wagner ....................... 181/255
4,382,487 A * 5/1983 Baumann .................... 181/282
4,388,804 A * 6/1983 Bushmeyer .................. 60/319
4,786,299 A * 11/1988 DeMarco ...................... 96/382
4,970,753 A * 11/1990 Herron, Jr. .................. 15/326
5,043,147 A * 8/1991 Knight ........................ 422/180
5,321,215 A * 6/1994 Kicinski ..................... 181/211
5,991,969 A * 11/1999 Lee ............................ 15/326
6,070,289 A * 6/2000 Lee et al. .................... 15/329
6,094,774 A * 8/2000 Larsen et al. ................. 15/326
6,467,570 B1 * 10/2002 Herold ....................... 181/231
6,543,575 B1 * 4/2003 Marcellus .................... 181/224

\* cited by examiner

Primary Examiner—Terrence R. Till
(74) Attorney, Agent, or Firm—Hoffmann & Baron, LLP

(57) ABSTRACT

A noise suppressor for use with the vacuum air cleaner includes an enclosed casing. On the casing, there are an air intake end and an air outlet end. Between the air intake end and the air outlet end, there is the noise suppressing chamber. At the air intake end and the air outlet end, there are the air intake area and the air outlet area made up of densely arranged dust-shaped air exhaust microholes. The air intake sectional area and air outlet sectional area, which are defined by the cross-sectional area of the microholes respectively, are smaller than the sectional area of the noise suppressing chamber. A number of noise suppressing structures or arrangements may be used to form the noise suppressor. After being installed at the air exhaust port of the vacuum air cleaner, the noise suppressor can greatly reduce the noise the vacuum air cleaner gives out when in use.

7 Claims, 3 Drawing Sheets ated duct-shaped air exhaust microholes. The air intake sectional area and the air outlet sectional area are respectively smaller than the sectional area of the noise suppressing chamber. The air intake direction and air outlet direction of the air intake area and the air outlet area may be the same but may also have an included angle between them.

NOISE SUPPRESSOR FOR USE WITH VACUUM AIR CLEANER

CROSS-REFERENCE TO RELATED APPLICATIONS

This applications claims priority to Chinese Application No. CN 02148547.X, filed Dec. 12, 2002.

FIELD OF THE INVENTION

This invention relates to a noise suppressor and to a vacuum air cleaner having a noise suppressor.

BACKGROUND OF RELATED TECHNOLOGY

In the existing technology, the air exhaust port of the vacuum air cleaner is usually of the grid structure, whose function is only to prevent impurities from exiting the vacuum air cleaner. The grid structure has no noise suppression effect. Therefore, the ordinary vacuum air cleaner gives out comparatively loud noise while in use.

SUMMARY OF THE INVENTION

The purpose of this invention is to provide a noise suppressor for use with a vacuum cleaner. A number of noise suppressing structures or configurations may be used or integrated to form the noise suppressor of the present invention. After being installed at the air exhaust port of the vacuum air cleaner, it can greatly reduce the noise the vacuum air cleaner gives out when in use.

In one aspect of the present invention, a noise suppressor for use with the vacuum air cleaner includes an enclosed casing. On the casing, there are the air intake end and the air outlet end. Between the air intake end and the air outlet end, there is the noise suppressing chamber. At the air intake end and the air outlet end, are respectively, the air intake area and the air outlet are made up of densely arranged duct-shaped air exhaust microholes. The air intake sectional area and the air outlet sectional area are respectively smaller than the sectional area of the noise suppressing chamber.

In another aspect of the present invention, a noise suppressor for use with the vacuum air cleaner includes an enclosed casing. On the casing, there are the air intake end and the air outlet end. Between the air intake end and the air outlet end, there is the noise suppressing chamber. At the air intake end and the air outlet end, there are respectively the air intake area and air outlet area made up of densely arranged duct-shaped air exhaust microholes. The air intake sectional area and the air outlet sectional area are respectively smaller than the sectional area of the noise suppressing chamber. The air intake direction and air outlet direction of the air intake area and the air outlet area may be the same but may also have an included angle between them.

In yet another aspect of the present invention, a noise suppressor for use with the vacuum air cleaner includes an enclosed casing. On the casing, there are the air intake end and the air outlet end. Between the air intake end and the air outlet end there is the noise suppressing chamber. At the air intake end and the air outlet end, there are respectively the air intake area and air outlet area made of densely arranged duct-shaped air exhaust microholes. The air intake sectional area and the air outlet sectional area are respectively smaller than the sectional area of the noise suppressing chamber. The air intake direction and air outlet direction of the air intake area and the air outlet area may be the same, but may also have an included angle between them. The positions of the air intake area and the air outlet area of the air end and the air outlet end are staggered. Other than the air intake area and the air outlet area, the areas on the inner wall surfaces of the said air intake end and air outlet end are all filled with noise suppressing cotton.

Desirably, the noise suppressor of the present invention may include one or more of the following structures, configurations or features:

1. Since the air inlet area and air outlet area of the present invention are made up of densely arranged duct-shaped air exhaust microholes, the air exhaust noise can be reduced, the smaller the air exhaust holes and the longer the pipeline, the better the noise reduction effect.
2. Since there is a noise suppressing chamber between the air inlet end and the air outlet end, when the gas entering the air intake area enters the noise suppressing chamber, its volume increases instantaneously, thus noise can be reduced.
3. The positions of the air inlet area and the air outlet area of the present invention may be arranged in such a way that they are staggered from each other. The gas entering from the duct-shaped air exhaust microholes in the air intake area, after entering the noise suppressing chamber, bends before being able to enter the duct-shaped air exhaust microholes in the air outlet area, thus noise can also be reduced.
4. In the present invention, other than the air intake area and the air outlet area, the areas on the inner wall surface of the air intake end and the air outlet end may be all filled with noise suppressing cotton, which can likewise reduce the air exhaust noise of the vacuum air cleaner.

The above-mentioned four kinds of structure can be incorporated or integrated in the present invention, thus the noise suppressing function is greatly increased. After this invention is installed at the air exhaust port of the vacuum air cleaner, the working noise of the vacuum air cleaner can be greatly reduced.

BRIEF DESCRIPTION OF THE DRAWINGS

In the following a further description of this invention will be made with reference to the preferred embodiments in which.

DETAILED DESCRIPTION OF THE INVENTION

Figure 1:
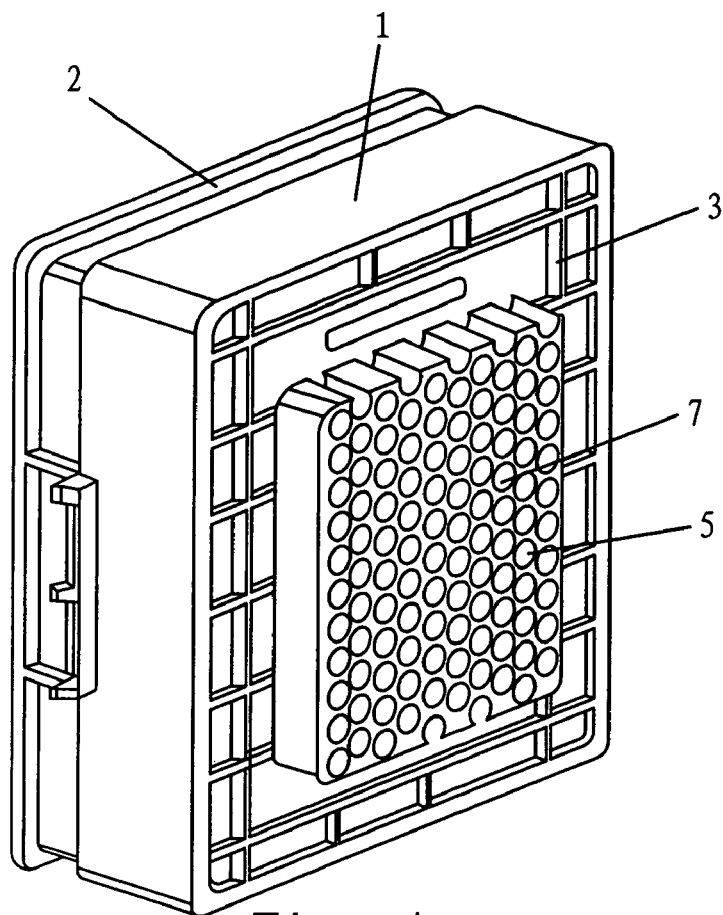
FIG. 1 is a perspective view of the noise suppressor of embodiment 1 having straight or unidirectional air intake and air outlet direction.
Figure 2:
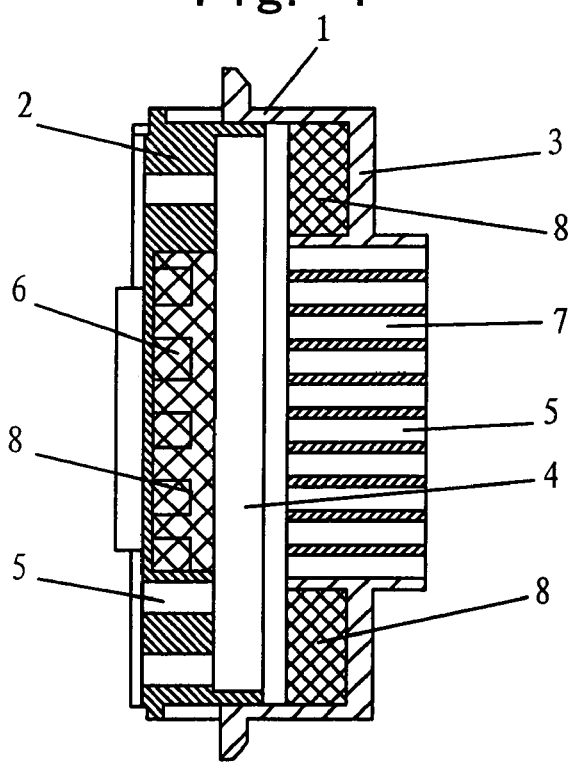
FIG. 2 is a cross-sectional view of the noise suppressor of embodiment 1 of FIG. 1.
Figure 3:
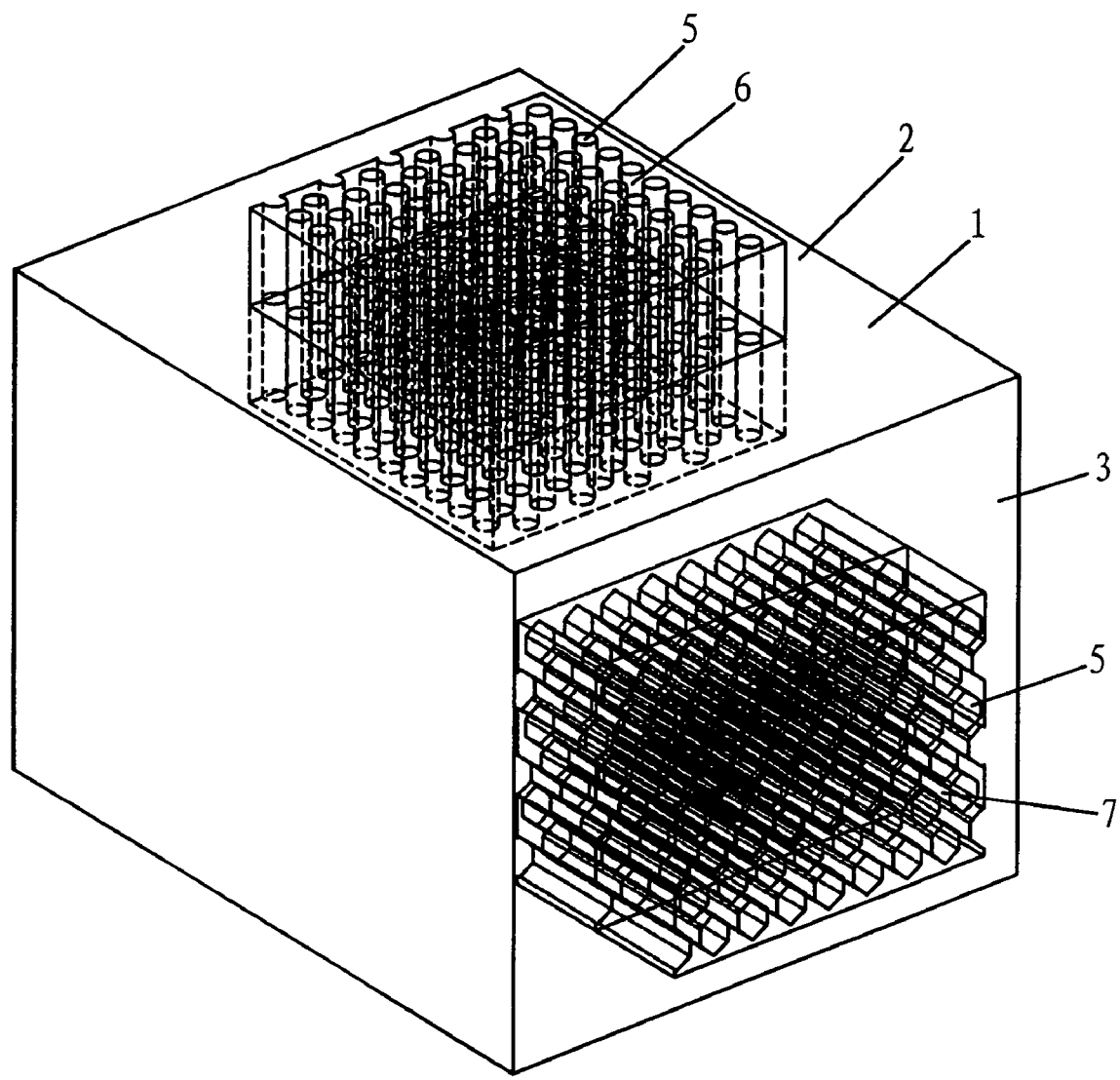
FIG. 3 is a perspective view of the noise suppressor of embodiment 2 having an included angle between the air inlet direction and the air outlet direction.

The noise suppressor according to embodiment 1 is shown in FIG. 1 and FIG. 2. The equipment of this embodiment includes an enclosed casing (1); on the casing (1), there are the air intake end (2) and the air outlet end (3); the air intake end (2) and the air outlet end (3) are respectively located at the front end and rear end of the casing (1); the air intake direction is the same as the air outlet direction; between the air intake end (2) and the air outlet end (3), there is the noise suppressing chamber (4); at the air intake end (2) and the air outlet end (3), there are the air intake area (6) and the air outlet area (7) made up of densely arranged duct-shaped air exhaust microholes; and the air intake sectional area and the air outlet sectional area are respectively smaller than the sectional area of the noise suppressing chamber (4); the air intake area (6) at the air intake end (2) is located around the air intake end (2); the middle part of the inner wall of the air intake end (2) is embedded with noise suppressing cotton (8); the air outlet area (7) of the said air outlet end (3) is located at the middle part of the air outlet end (3); around the inner wall of the air outlet end (3) is embedded with noise suppressing cotton (8).

A noise suppressor according to embodiment 2 for use with the vacuum air cleaner is shown in FIG. 2. The equipment of this embodiment includes an enclosed casing (1); on the casing, there are the air inlet end (2) and the air outlet end (3); the air inlet end (2) and the air outlet end (3) are respectively located at the front end and side end of the casing (1); there is an included angle between the air inlet direction and the air outlet direction; between the air intake end (2) and the air outlet end (3), there is the noise suppressing chamber (4); at the air intake end (2) and the air outlet end (3), there are the air inlet area (6) and the air outlet area (7) made up of densely arranged duct-shaped air exhaust microholes; and the intake sectional area and the air outlet sectional area are respectively smaller than the sectional area of the noise suppressing chamber (4).

Figure 4:
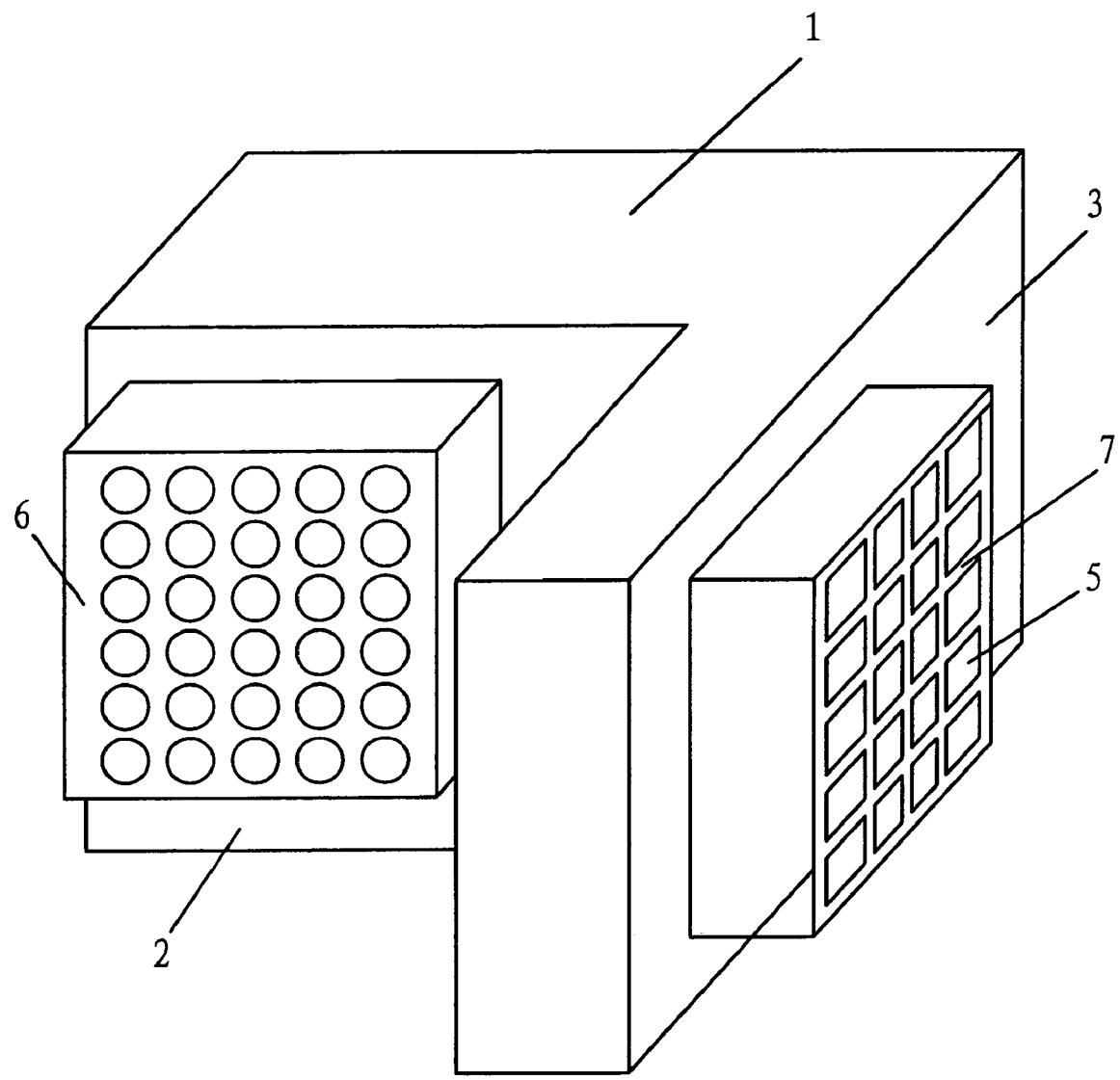
FIG. 4 is a perspective view of the noise suppressor of embodiment 3 having a casing, an air inlet end, an air outlet end, a noise suppressing chamber, a duct-shaped air exhaust microhole, an air intake area, an air outlet area and noise suppressing cotton.

A noise suppressor according to embodiment 3 for use with the vacuum air cleaner is shown in FIG. 4. The equipment of this embodiment includes an enclosed casing (1); on the casing (1), there are the air inlet end (2) and the air outlet end (3); the air inlet end (2) and the air outlet end (3) are respectively located at different sides of the casing (1); between the air intake direction and the air outlet direction, there is an included angle; between the air intake end (2) and the air outlet end (3), there is the noise suppressing chamber (4); at the air intake end (2) and the air outlet end (3), there are the air intake area (6) and the air outlet area (7) made up of densely arranged duct-shaped air exhaust microholes (5); and the air intake sectional area and the air outlet sectional area are respectively smaller than the sectional area of the noise suppressing chamber (4).

Desirably, the present invention includes one or more of the following structures or features. Since the air intake area (6) and the air outlet area (7) of this invention are made up of densely arranged duct-shaped air exhaust microholes, the air exhaust noise of the vacuum air cleaner can be reduced. The smaller the air exhaust holes, the better the noise reduction effect. The longer the duct, the better the noise reduction effect. Since in this invention, between the air inlet end (2) and the air outlet end (3), there is the noise suppressing chamber (4), 50 that when the gas entering from the air inlet area (6) enters the noise suppressing chamber (4), its volume increase instantaneously, thus noise can be greatly reduced. The positions of the air intake area (6) and the air outlet area (7) of this invention are arranged in such a way that they are staggered from each other, the gas entering from the duct-shaped air exhaust microholes (5) in the air intake area (6), after entering the noise suppressing chamber (4), needs bending before being able to enter the duct-shaped air exhaust microholes (5) in the air outlet area (7), thus noise can also be reduced. In the present invention, other than the air intake area (6) and the air outlet area (7), the areas on the inner surfaces of the air intake end (2) and the air outlet end (3) are all filled with noise suppressing cotton, which can likewise reduce the air exhaust noise of the vacuum air cleaner. The above-mentioned four kinds of structure or features may be incorporated or integrated to form a noise suppressor of the present invention, thus the noise suppressing function is greatly increased. After this invention is installed at the air exhaust port of the vacuum air cleaner, the working noise of the vacuum air cleaner can be greatly reduced.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A noise suppressor for use with a vacuum air cleaner comprising:
    an enclosed casing (1) having an air intake end (2) and an air outlet end (3);
    a noise suppressing chamber (4) located between the air intake end (2) and the air outlet end (3); and
    an air intake area (6) located at the air intake end (2) and an air outlet area (7) located at the air outlet end (3), the air intake area (6) and the air outlet area (7) each having a plurality densely arranged elongate duct-shaped air exhaust microholes (5) in communication with the noise suppressing chamber (4), the microholes defining an air intake sectional area and an air outlet sectional area, respectively; wherein
    the air intake sectional area and the air outlet sectional area are smaller than a sectional area of the noise suppressing chamber (4) and air intake direction and air outlet direction of the air inlet area (6) and the air outlet area (7) have an included angle therebetween.

2. The noise suppressor for use with the vacuum air cleaner according to claim 1, wherein the positions of the air inlet area (6) at the air intake end (2) and the air outlet area (7) at the air outlet end (3) are staggered.

3. The noise suppressor for use with the vacuum air cleaner according to claim 1, wherein other than the air intake area (6) and the air outlet area (7), the areas on inner wall surfaces of the air intake end (2) and the air outlet end (3) are all filled with noise suppressing cotton.

4. A noise suppressor for use with a vacuum air cleaner, comprising:
    an enclosed casing (1) having an air intake end (2) and an air outlet end (3);
    a noise suppressing chamber (4) located between the air intake end (2) and the air outlet end (3); and
    an air intake area (6) located at the air intake end (2) and an air outlet area (7) located at the air outlet end (3), the air intake area (6) and the air outlet area (7) each having a plurality densely arranged elongate duct-shaped air exhaust microholes (5) in communication with the noise suppressing chamber (4), the microholes defining an air intake sectional area and an air outlet sectional area, respectively; wherein
    the air intake sectional area and the air outlet sectional area are smaller than a sectional area of the noise suppressing chamber (4),
    air intake direction and air outlet direction of the air intake area (6) and the air outlet area (7) are the same, and other than the air intake area (6) and the air outlet area (7), the areas on inner wall surfaces of the air intake end (2) and the air outlet end (3) are all filled with noise suppressing cotton.

5. The noise suppressor for use with the vacuum air cleaner according to claim 4, wherein the positions of the air inlet area (6) at the air intake end (2) and the air outlet area (7) at the air outlet end (3) are staggered.

6. A noise suppressor for use with a vacuum air cleaner comprising:
- an enclosed casing (1) having an air intake end (2) and an air outlet end (3);
- a noise suppressing chamber (4) located between the air intake end (2) and the air outlet end (3); and
- an air intake area (6) located at the air intake end (2) and an air outlet area (7) located at the air outlet end (3), the air intake area (6) and the air outlet area (7) each having a plurality densely arranged elongate duct-shaped air exhaust microholes (5) in communication with the noise suppressing chamber (4), the microholes defining an air intake sectional area and an air outlet sectional area, respectively;
- wherein the air intake sectional area and the air outlet sectional area are smaller than a sectional area of the noise suppressing chamber (4) and
- further wherein other than the air intake area (6) and the air outlet area (7), the areas on inner wall surfaces of the air intake end (2) and the air outlet end (3) are all filled with noise suppressing cotton.

7. A vacuum air cleaner, comprising:
- a vacuum air cleaner having an air exhaust port, and
- a noise suppressor disposed at the air exhaust port, the noise suppressor comprising:
- an enclosed casing (1) having an air intake end (2) and an air outlet end (3);
- a noise suppressing chamber (4) located between the air intake end (2) and the air outlet end (3); and
- an air intake area (6) located at the air intake end (2) and an air outlet area (7) located at the air outlet end (3), the air intake area (6) and the air outlet area (7) each having a plurality densely arranged elongate duct-shaped air exhaust microholes (5) in communication with the noise suppressing chamber (4), the microholes defining an air intake sectional area and an air outlet sectional area, respectively;
- wherein the air intake sectional area and the air outlet sectional area are smaller than a sectional area of the noise suppressing chamber (4), and
- further wherein other than the air intake area (6) and the air outlet area (7), the areas on inner wall surfaces of the air intake end (2) and the air outlet end (3) are all filled with noise suppressing cotton.

* * * * *